(12) United States Patent
Morgan et al.

(10) Patent No.: US 11,584,974 B2
(45) Date of Patent: *Feb. 21, 2023

(54) SYSTEM AND METHOD INCLUDING MULTI-CIRCUIT SOLUTION EXTRACTION FOR RECOVERY OF METAL VALUES FROM METAL-BEARING MATERIALS

(71) Applicant: FREEPORT MINERALS CORPORATION, Phoenix, AZ (US)

(72) Inventors: Jason M Morgan, Morenci, AZ (US); Barbara J Savage, Silver City, NM (US); David G Meadows, Phoenix, AZ (US); Wayne W Hazen, Lakewood, CO (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/366,653

(22) Filed: Jul. 2, 2021

(65) Prior Publication Data

US 2021/0332458 A1  Oct. 28, 2021

Related U.S. Application Data

(60) Continuation of application No. 16/671,323, filed on Nov. 1, 2019, now Pat. No. 11,053,566, which is a
(Continued)

(51) Int. Cl.
*C22B 3/02* (2006.01)
*B01D 11/02* (2006.01)
(Continued)

(52) U.S. Cl.
CPC ............ *C22B 3/02* (2013.01); *B01D 11/028* (2013.01); *B01D 11/0488* (2013.01); *C22B 3/20* (2013.01);
(Continued)

(58) Field of Classification Search
CPC .... C22B 3/02; C22B 3/26; C22B 3/20; C22B 3/44; B01D 11/0288; B01D 11/0488; C25C 7/00
See application file for complete search history.

(56) References Cited

U.S. PATENT DOCUMENTS

| 1,614,669 A | 1/1927 | Greenawalt |
| 1,798,255 A | 3/1931 | Greenawalt |
(Continued)

FOREIGN PATENT DOCUMENTS

| EP | 1063307 | 12/2000 |
| JP | 2001239139 | 9/2001 |
(Continued)

OTHER PUBLICATIONS

International Search Report and Written Opinion from corresponding International Application No. PCT/US2008/075037 dated Dec. 10, 2008.
(Continued)

*Primary Examiner* — Scott R Kastler
(74) *Attorney, Agent, or Firm* — Snell & Wilmer L.L.P.

(57) ABSTRACT

The present disclosure relates to a metal recovery process comprising a solvent extraction process. In an exemplary embodiment, the solution extraction system comprises a plant with a first and second circuit. A high-grade pregnant leach solution ("HGPLS") is provided to the first and second circuit, and a low-grade pregnant leach solution ("LGPLS") is provided to the second circuit. The first circuit produces a rich electrolyte, which can be forwarded to a primary metal recovery, and a low-grade raffinate, which can be forwarded to a secondary metal recovery process. The second circuit produces a rich electrolyte, which can also be forwarded to the primary metal recovery process. The first and second circuits are in fluid communication with each other.

17 Claims, 5 Drawing Sheets

Related U.S. Application Data continuation of application No. 16/020,405, filed on Jun. 27, 2018, now Pat. No. 10,501,821, which is a continuation of application No. 14/920,768, filed on Oct. 22, 2015, now Pat. No. 10,036,080, which is a division of application No. 13/331,717, filed on Dec. 20, 2011, now Pat. No. 9,169,533.

(51) Int. Cl.
| | |
|---|---|
| B01D 11/04 | (2006.01) |
| C22B 3/26 | (2006.01) |
| C22B 3/20 | (2006.01) |
| C22B 3/44 | (2006.01) |
| C25C 7/00 | (2006.01) |

(52) U.S. Cl.
CPC .............. *C22B 3/26* (2021.05); *C22B 3/44* (2013.01); *C25C 7/00* (2013.01); *Y02P 10/20* (2015.11)

(56) References Cited

U.S. PATENT DOCUMENTS

| | | | |
|---|---|---|---|
| 1,808,547 A | 6/1931 | Greenawalt | |
| 1,841,437 A | 1/1932 | Greenawalt | |
| 2,992,894 A | 7/1961 | Hazen | |
| 3,524,723 A | 8/1970 | Millsap et al. | |
| 3,528,784 A | 9/1970 | Green | |
| 3,615,170 A | 10/1971 | Hazen et al. | |
| 4,013,754 A | 3/1977 | Stauter et al. | |
| 4,152,142 A | 5/1979 | Schlitt et al. | |
| 4,272,492 A | 6/1981 | Jensen | |
| 4,338,168 A | 7/1982 | Stanley et al. | |
| 4,526,215 A | 7/1985 | Harrison et al. | |
| 4,582,689 A | 4/1986 | Kordosky | |
| 4,666,512 A | 5/1987 | Hansen et al. | |
| 4,957,714 A | 9/1990 | Olafson et al. | |
| 5,356,457 A | 10/1994 | Pincheira et al. | |
| 5,431,788 A | 7/1995 | Jones | |
| 5,470,552 A | 10/1995 | Kordosky et al. | |
| 5,632,963 A | 5/1997 | Schwab et al. | |
| 5,645,708 A | 7/1997 | Jones | |
| 5,650,057 A | 7/1997 | Jones | |
| 5,869,012 A | 2/1999 | Jones | |
| 5,879,556 A | 3/1999 | Hein | |
| 5,902,474 A | 5/1999 | Jones | |
| 5,908,605 A | 6/1999 | Virnig et al. | |
| 5,919,674 A | 7/1999 | Tunley | |
| 5,976,218 A | 11/1999 | Virnig et al. | |
| 6,107,523 A | 8/2000 | Virnig et al. | |
| 6,171,564 B1 | 1/2001 | Jones | |
| 6,177,055 B1 | 1/2001 | Virnig et al. | |
| 6,242,625 B1 | 6/2001 | Kordosky | |
| 6,245,125 B1 | 6/2001 | Dew et al. | |
| RE37,251 E | 7/2001 | Jones | |
| 6,350,354 B1 | 2/2002 | Neuman et al. | |
| 6,395,062 B2 | 5/2002 | Olafson et al. | |
| 6,432,167 B1 | 8/2002 | Virnig et al. | |
| 6,451,088 B1 | 9/2002 | Marsden | |
| 6,455,019 B2 | 9/2002 | Jones | |
| 6,582,494 B1 | 6/2003 | Dew et al. | |
| 6,596,053 B2 | 7/2003 | Virnig et al. | |
| 6,599,414 B1 | 7/2003 | Virnig et al. | |
| 6,702,872 B1 | 3/2004 | Virnig et al. | |
| 6,726,887 B1 | 4/2004 | Sugarman | |
| 6,733,688 B1 | 5/2004 | Sugarman et al. | |
| 7,166,144 B2 | 1/2007 | Hein et al. | |
| 7,169,371 B2 | 1/2007 | Jones | |
| 7,214,256 B2 | 5/2007 | Kordosky et al. | |
| 7,309,474 B2 | 12/2007 | Soderstrom | |
| 7,390,468 B2 | 6/2008 | Pekkala et al. | |
| 8,003,064 B2 | 8/2011 | Savage et al. | |
| 8,372,360 B2 | 2/2013 | Savage et al. | |
| 8,372,361 B2 | 2/2013 | Savage et al. | |
| 8,420,048 B1 | 4/2013 | Raman et al. | |
| 8,828,353 B2 | 9/2014 | Savage et al. | |
| 9,023,313 B2 | 5/2015 | Raman et al. | |
| 9,169,533 B2* | 10/2015 | Morgan | B01D 11/0488 |
| 9,447,483 B2 | 9/2016 | Raman et al. | |
| 9,856,570 B2 | 1/2018 | Raman et al. | |
| 10,036,080 B2* | 7/2018 | Morgan | C22B 3/02 |
| 10,036,096 B2 | 7/2018 | Raman et al. | |
| 10,501,821 B2* | 12/2019 | Morgan | C25C 7/00 |
| 10,793,958 B2 | 10/2020 | Raman et al. | |
| 11,053,566 B2* | 7/2021 | Morgan | C22B 3/26 |
| 2004/0103756 A1 | 6/2004 | Kordosky et al. | |
| 2004/0141896 A1 | 7/2004 | Pekkala et al. | |
| 2004/0228783 A1 | 11/2004 | Harris et al. | |
| 2004/0261579 A1 | 12/2004 | Hein et al. | |
| 2005/0031512 A1 | 2/2005 | Kordosky et al. | |
| 2005/0066773 A1 | 3/2005 | Harlamovs et al. | |
| 2006/0088458 A1 | 4/2006 | Kordosky et al. | |
| 2006/0117908 A1 | 6/2006 | Virnig et al. | |
| 2008/0023342 A1 | 1/2008 | Marsden | |
| 2009/0074639 A1 | 3/2009 | Savage et al. | |
| 2013/0152741 A1 | 6/2013 | Morgan | |
| 2015/0203935 A1* | 7/2015 | Nisbett | C22B 3/44 423/1 |
| 2016/0053341 A1 | 2/2016 | Morgan | |
| 2016/0355937 A1 | 12/2016 | Raman | |
| 2020/0063236 A1 | 2/2020 | Morgan et al. | |

FOREIGN PATENT DOCUMENTS

| | | |
|---|---|---|
| WO | WO200015857 | 3/2000 |
| WO | WO2002092863 | 11/2002 |
| WO | WO2006041695 | 4/2006 |

OTHER PUBLICATIONS

International Preliminary Report on Patentability from corresponding International Application No. PCT/US2008/075037, dated Apr. 1, 2010.

Non-Final Office Action from U.S. Appl. No. 11/856,605, dated Aug. 12, 2010.

Non-Final Office Action from U.S. Appl. No. 11/856,605, dated Nov. 19, 2010.

Examination Report from corresponding Australian Patent Application No. 2008302558, dated Sep. 17, 2010.

Examination Report from corresponding European Patent Application No. 08 832 712.7, dated Aug. 20, 2010.

Examination Report from corresponding European Patent Application No. 08 832 712.7, dated Jul. 4, 2011.

Anderson et al.: "Selection and Sizing of Copper Solvent Extraction and Electrowinning Equipment and Circuits"; Mineral Processing, 2002.

Owusu, George; "Selective Extraction of Copper from Acidic Zinc Sulfate Leach Solution Using LIX 622" Hydrometallugy, Jan. 1999, 51(1), pp. 1-8.

Kordosky, G.A.; "Copper Recovery Using Leach/Solvent Extraction/Electrowinning Technology: Forty Years of Innovation, 2.2 Million Tonnes of Copper Annually" The Journal of the South African Institute of Mining and Metallurgy, Nov./Dec. 2002, pp. 445-450.

Jergensen, Gerald V.; "Copper Leaching, Solvent Extraction, and Electrowinning Technology"; Society for Mining, Metallurgy, and Exploration, Inc.; 1999.

O'Brien, et al.; "Operational Changes at Phelps Dodge's Morenci Mine".

White, R. Hunter; "Morenci: Making the Most of a World Class Resource"; pp. 229-238.

"Escondida" Paper.

Notice of Allowance from U.S. Appl. No. 11/856,605, dated Apr. 19, 2011.

Restriction Requirement from U.S. Appl. No. 13/188,231, dated Nov. 21, 2011.

Non-Final Office Action from U.S. Appl. No. 13/188,231, dated Feb. 8, 2012.

(56) References Cited

OTHER PUBLICATIONS

Non-Final Office Action from U.S. Appl. No. 13/188,231, dated Jul. 25, 2012.
Examiner Interview from U.S. Appl. No. 13/188,231, dated Sep. 7, 2012.
Notice of Allowance from U.S. Appl. No. 13/188,231, dated Oct. 10, 2012.
Supplemental Notice of Allowance from U.S. Appl. No. 13/188,231, dated Nov. 15, 2012.
Non-Final Office Action from U.S. Appl. No. 13/302,369, dated Apr. 3, 2012.
Final Office Action from U.S. Appl. No. 13/302,369, dated Sep. 13, 2012.
Notice of Allowance from U.S. Appl. No. 13/302,369, dated Oct. 12, 2012.
Examination Report dated Nov. 15, 2011 in corresponding Chilean Patent Application No. 2712-2008 and machine translation of same in English.
Examination Report dated Oct. 12, 2011 in Canadian Patent Application No. 2,699,893.
Examination Report dated May 15, 2012 in Peruvian Patent Application No. 001618-2008 and machine translation of same in English.
Restriction Requirement from U.S. Appl. No. 13/331,699, dated May 10, 2012.
Non-Final Office Action from U.S. Appl. No. 13/331,699, dated Jul. 13, 2012.
Final Office Action from U.S. Appl. No. 13/331,699, dated Nov. 1, 2012.
Notice of Allowance from U.S. Appl. No. 13/331,699, dated Dec. 24, 2012.
Non-Final Office Action from U.S. Appl. No. 13/736,568, dated Sep. 10, 2013.
Final Office Action from U.S. Appl. No. 13/736,568, dated Mar. 10, 2014.
Notice of Allowance from U.S. Appl. No. 13/736,568, dated May 9, 2014.
U.S. Environmental Protection Agency; "Extraction and Beneficiation of Ores and Minerals"; Technical Resource Document, vol. 4 Copper, Aug. 1994, 363 pages.
International Search Report and Written Opinion issued from corresponding International Application No. PCT/US2012/069392, dated Mar. 14, 2013.
International Search Report and Written Opinion issued from International Application No. PCT/US2012/065570, dated Mar. 14, 2013.
Written Opinion of the International Preliminary Examining Authority issued from corresponding International Application No. PCT/US2012/069392, dated Nov. 22, 2013.
Written Opinion of the International Preliminary Examining Authority issued from International Application No. PCT/US2012/065570, dated Nov. 22, 2013.
International Preliminary Report on Patentability issued from corresponding International Application No. PCT/US2012/069392, dated Apr. 7, 2014.
International Preliminary Report on Patentability issued from corresponding International Application No. PCT/US2012/065570, dated Apr. 7, 2014.
Non-Final Office Action from U.S. Appl. No. 13/829,328, dated May 6, 2014.
Final Office Action from U.S. Appl. No. 13/829,328, dated Oct. 20, 2014.
Non-Final Office Action from U.S. Appl. No. 13/837,158, dated Dec. 26, 2014.
Notice of Allowance from U.S. Appl. No. 13/829,328, dated Jan. 2, 2015.
Supplemental Notice of Allowance from U.S. Appl. No. 13/829,328 dated Apr. 7, 2015.
Non-Final Office Action from U.S. Appl. No. 13/837,158, dated Aug. 13, 2015.
Final Office Action from U.S. Appl. No. 13/837,158, dated Feb. 25, 2016.
Notice of Allowance from U.S. Appl. No. 13/837,158, dated May 18, 2016.
Non-Final Office Action from U.S. Appl. No. 15/240,383, dated Jan. 27, 2017.
Notice of Allowance from U.S. Appl. No. 15/240,383, dated Aug. 30, 2017.
Non-Final Office Action from U.S. Appl. No. 14/832,742, dated Mar. 9, 2018.
Notice of Allowance from U.S. Appl. No. 14/832,742, dated Apr. 18, 2018.
Restriction Requirement from U.S. Appl. No. 13/331,717, dated Jun. 17, 2014.
Non-Final Office Action from U.S. Appl. No. 13/331,717, dated Dec. 3, 2014.
Final Office Action from U.S. Appl. No. 13/331,717, dated Apr. 15, 2015.
Examiner Interview from U.S. Appl. No. 13/331,717, dated Jun. 3, 2015.
Notice of Allowance from U.S. Appl. No. 13/331,717, dated Jun. 22, 2015.
Non-Final Office Action from U.S. Appl. No. 14/920,768, dated Sep. 14, 2017.
Final Office Action from U.S. Appl. No. 14/920,768, dated Feb. 21, 2018.
Examiner Interview from U.S. Appl. No. 14/920,768, dated Apr. 25, 2018.
Notice of Allowance from U.S. Appl. No. 14/920,768, dated May 22, 2018.
Non-Final Office Action from U.S. Appl. No. 16/020,405, dated Jun. 28, 2019.
Notice of Allowance from U.S. Appl. No. 16/020,405, dated Sep. 27, 2019.
Non-Final Office Action from U.S. Appl. No. 16/671,323, dated Jan. 28, 2021.
Notice of Allowance from U.S. Appl. No. 16/671,323, dated Mar. 10, 2021.

* cited by examiner

SYSTEM AND METHOD INCLUDING MULTI-CIRCUIT SOLUTION EXTRACTION FOR RECOVERY OF METAL VALUES FROM METAL-BEARING MATERIALS

CROSS REFERENCE TO RELATED APPLICATIONS

This application is a continuation application of and claims priority to U.S. patent application Ser. No. 16/671,323, entitled "SYSTEM AND METHOD INCLUDING MULTI-CIRCUIT SOLUTION EXTRACTION FOR RECOVERY OF METAL VALUES FROM METAL-BEARING MATERIALS," which was filed on Nov. 1, 2019 (the '323 application), now U.S. Pat. No. 11,053,566, issued on Jul. 6, 2021. The '323 application is a continuation of and claims priority to U.S. patent application Ser. No. 16/020,405, entitled "SYSTEM AND METHOD INCLUDING MULTI-CIRCUIT SOLUTION EXTRACTION FOR RECOVERY OF METAL VALUES FROM METAL-BEARING MATERIALS," which was filed on Jun. 27, 2018, now U.S. Pat. No. 10,501,821, issued Dec. 10, 2019 (the "'405 application). The '405 application is a continuation application of and claims priority to U.S. patent application Ser. No. 14/920,768, entitled "SYSTEM AND METHOD INCLUDING MULTI-CIRCUIT SOLUTION EXTRACTION FOR RECOVERY OF METAL VALUES FROM METAL-BEARING MATERIALS," which was filed on Oct. 22, 2015, now U.S. Pat. No. 10,036,080, issued Jul. 31, 2018 (the '768 application). The '768 Application is a divisional application of and claims priority to U.S. patent application Ser. No. 13/331,717, entitled "SYSTEM AND METHOD INCLUDING MULTI-CIRCUIT SOLUTION EXTRACTION FOR RECOVERY OF METAL VALUES FROM METAL-BEARING MATERIALS," which was filed on Dec. 20, 2011, now U.S. Pat. No. 9,169,533, issued Oct. 27, 2015. The aforementioned applications are hereby incorporated by reference herein in their entireties.

FIELD OF THE INVENTION

The invention relates generally to systems and methods for extraction of metal values from metal-bearing materials, and more specifically, to systems and methods for recovering metal values using solution extraction techniques.

BACKGROUND OF THE INVENTION

Hydrometallurgical treatment of metal-bearing materials, such as metal ores, metal-bearing concentrates, and other metal-bearing substances, has been well established for many years. Moreover, leaching of metal-bearing materials is a fundamental process utilized to extract metal value from metal-bearing materials. Typical leach processes comprise contacting a metal-bearing material with an aqueous solution containing a leaching agent which extracts the metal or metals from the metal-bearing material into solution. For example, in copper leaching operations, especially copper from copper minerals, such as chalcopyrite and chalcocite, aqueous sulfuric acid is contacted with a copper-bearing ore. During the leaching process, acid in the leach solution may be consumed and various soluble components are dissolved thereby increasing the metal content of the aqueous solution.

The aqueous leach solution containing the leached metal can then be treated by, for example, solution extraction, wherein the aqueous leach solution is contacted with an organic solution comprising a metal-specific extraction reagent, for example, an aldoxime and/or ketoxime, to form an aqueous phase and an organic phase. The metal-specific extraction reagent extracts the metal from the aqueous phase into the organic phase. During a solution extraction process for copper and certain other metals, a leaching agent may be regenerated in the aqueous phase. For example, when sulfuric acid is used as the leaching agent, sulfuric acid can be regenerated in the aqueous phase when copper is extracted into the organic phase by the extraction reagent.

After copper is removed from the aqueous phase into the organic phase, the diluted aqueous solution, now called the raffinate, may be recycled back to the leaching process, recycled to the front of a solid-liquid separation process, and/or forwarded to secondary metal extraction processes, such as, for example, cobalt recovery.

Numerous technical challenges exist with typical leaching and solvent extraction processes. For example, under current leaching and solution extraction processes, large concentrations of soluble metal and metal precipitate can be lost in the metal-depleted, acid-containing aqueous phase raffinate solutions. These losses lead to inefficiencies and relatively low overall process yields. Additionally, relatively high primary metal concentrations (such as copper) in the raffinate make recovery of secondary metals costly and possibly impractical.

Accordingly, systems and methods for more easily controlling process conditions, such as the concentration of a primary metal the raffinate solution, would be advantageous. Additionally, systems and methods for improved recovery of secondary metals from a raffinate solution are desirable.

SUMMARY OF THE INVENTION

The present invention generally relates to a system and method for recovery of metal values from metal-bearing materials using solvent extraction techniques. The system and method employ a solvent extraction plant that includes a first circuit and a second circuit in fluid communication. As set forth in more detail below, various advantages of the system and method of the present disclosure include improved primary metal recovery, improved secondary metal recovery, and/or improved plant utilization.

An exemplary method for extracting one or more metal values from a metal-bearing solution comprises providing a first portion of a first metal-bearing solution to a first circuit of a solution extraction plant, providing a second portion of the first metal-bearing solution to a second circuit of the solution extraction plant, wherein the first circuit of the solution extraction plant and the second circuit of the solution extraction plant are in fluid communication with each other, providing a second metal-bearing solution to the second circuit of the solution extraction plant, extracting a first circuit raffinate, extracting a first circuit electrolyte, and extracting a second circuit electrolyte. The first circuit raffinate may comprise a low-grade raffinate. In accordance with various aspects of these embodiments, the first circuit and the second circuit are fluidly coupled by coupling an output of a first extractor of the second circuit to an input of a first extractor of the first circuit. Additionally, an output of a second extractor of the second circuit may be coupled to an input of a second extractor of the first circuit. In this case, a low-grade raffinate can be extracted from the first extractor of the first circuit, a high-grade raffinate can be extracted from the second extractor of the first circuit, and another high-grade raffinate can be extracted from a third extractor of the first circuit. In accordance with further aspects, lean electrolyte is provided to a stripper of the first circuit.

An exemplary system for extracting one or more metal values from a metal-bearing material comprises a first metal-bearing solution, a second metal-bearing solution, a solution extraction plant comprising a first circuit and a second circuit, wherein the first circuit comprises at least two first circuit extractors and at least one first circuit stripping unit, the second circuit comprises at least two second circuit extractors and at least one second circuit stripping unit, and the first circuit and second circuit are in fluid communication with each other. A second circuit raffinate may be produced by the second circuit and provided to one of the first circuit extractors. In accordance with additional aspects of these embodiments, the first circuit additionally involves a third extractor and a fourth extractor, and a second stripping unit.

In accordance with additional embodiments of the invention, an exemplary process for recovering one or more metals from a metal-bearing material comprises preparing a metal-bearing material, performing a reactive process on the metal-bearing material, extracting metal value from the processed metal-bearing material using the solution extraction method described herein, and subjecting extracted the metal value to at least one metal recovery step, such as electrowinning. In accordance with various aspects of these embodiments, the solution extraction method involves the use of a solution extraction plant comprising a first circuit and second circuit. The first circuit and the second circuit are fluidly coupled by coupling an output of a first extractor of the second circuit to an input of a first extractor of the first circuit. Additionally, an output of a second extractor of the second circuit may be coupled to an input of a second extractor of the first circuit. In this case, a low-grade raffinate can be extracted from the first extractor of the first circuit, a high-grade raffinate can be extracted from the second extractor of the first circuit, and another high-grade raffinate can be extracted from a third extractor of the first circuit. In accordance with further aspects, a lean electrolyte is provided to a stripper of the first circuit.

An exemplary system for recovering one or more metals from a metal-bearing material comprises a grinding unit, a leach system, one or more solid-liquid separators, a solution extraction plant with a first circuit and a second circuit as described herein, and at least one electrowinning operation.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

DETAILED DESCRIPTION

The detailed description of various embodiments herein makes reference to the accompanying drawing figures, which show various embodiments and implementations thereof by way of illustration, and not of limitation. While these embodiments are described in sufficient detail to enable those skilled in the art to practice the embodiments, it should be understood that other embodiments may be realized and that mechanical and other changes may be made without departing from the spirit and scope of the present disclosure. Furthermore, any reference to singular includes plural embodiments, and any reference to more than one component may include a singular embodiment.

A system and method of various exemplary embodiments of the present invention exhibit significant advancements over prior art processes, particularly with regard to metal recovery and process efficiency. Moreover, existing metal recovery systems and processes that utilize a reactive process and solution extraction for metal recovery may, in many instances, be easily retrofitted to exploit the many commercial benefits of the present invention.

In various exemplary embodiments, a metal recovery process comprises preparing a metal-bearing material, performing a reactive process on the metal-bearing material, extracting metal value from the processed metal-bearing material, and subjecting the extracted metal value to at least one metal recovery step, such as electrowinning.

Figure 1:
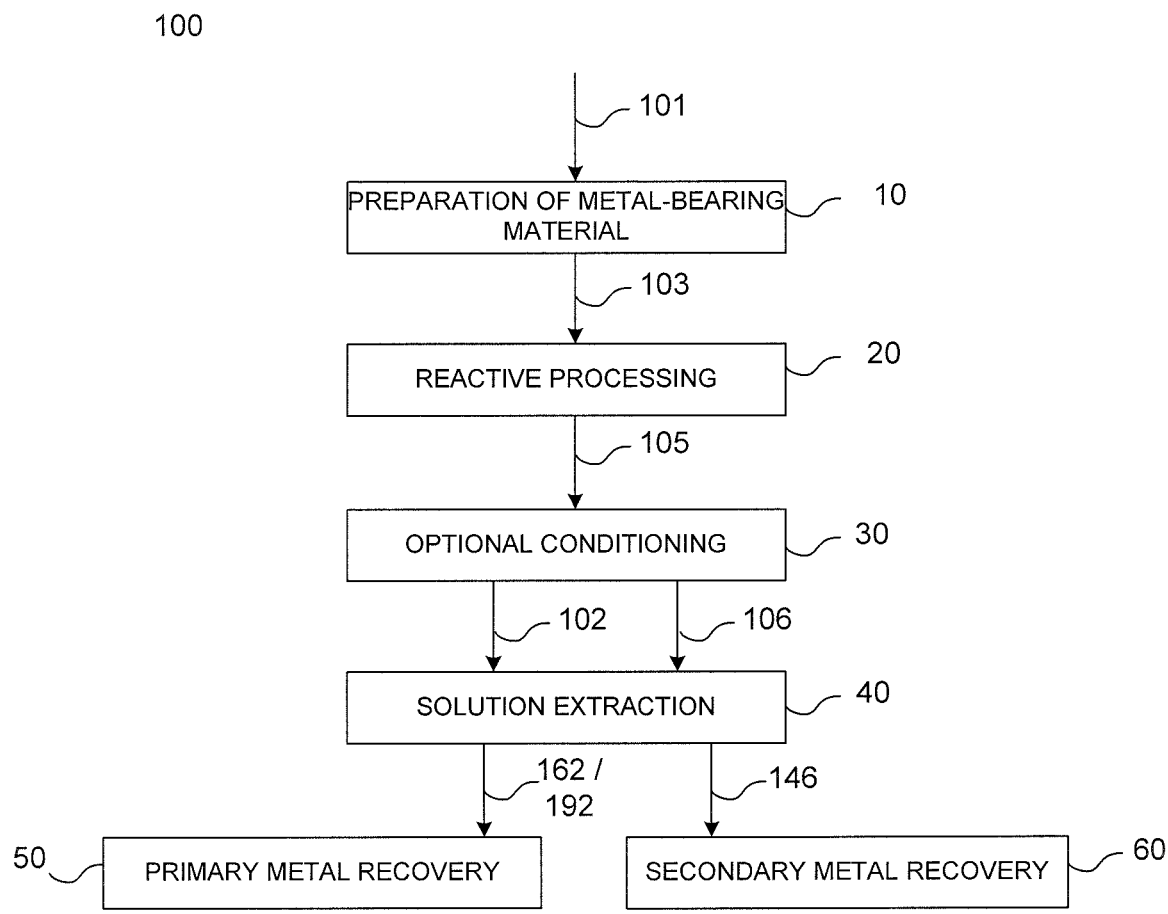
FIG. 1 illustrates a flow diagram of a metal recovery process in accordance with exemplary embodiments of the invention.

FIG. 1 illustrates an exemplary metal recovery process 100 for recovering a metal from a metal-bearing material 101, including the steps of preparing metal-bearing material step 10, reactive processing step 20, optional conditioning step 30, solution extraction step 40, primary metal recovery step 50 and optional secondary metal recovery step 60. In various exemplary embodiments, metal recovery process 100 is configured to recover multiple metal values from metal-bearing material 101. For example, metal recovery process 100 may be configured to recover a primary and a secondary metal, such as cobalt, from an ore and/or concentrate comprising a significant concentration of the primary metal.

Metal-bearing material 101 may be an ore, a concentrate, or any other material from which valuable and/or useful metal values may be recovered. Such metal values may include, for example, copper, gold, silver, zinc, platinum group metals, nickel, cobalt, molybdenum, rhenium, uranium, rare earth metals, and the like. By way of a specific example, metal recovery process 100 is configured to recover copper from copper-bearing material, such as, for example, ores and/or concentrates containing chalcopyrite ($CuFeS_2$), chalcocite ($Cu_2S$), bornite ($Cu_5FeS_4$), and covellite ($CuS$), malachite ($Cu_2CO_3(OH)_2$), pseudomalachite ($Cu_5[(OH)_2PO_4]_2$), azurite ($Cu_3(CO_3)_2(OH)_2$), chrysocolla (($Cu,Al)_2H_2Si_2O_5(OH)_4 \cdot nH_2O$), cuprite ($Cu_2O$), brochantite ($CuSO_4 \cdot 3Cu(OH)_2$), atacamite ($Cu_2[OH_3Cl]$) and other copper-bearing minerals or materials and mixtures thereof.

During preparation of metal-bearing material step 10, metal-bearing material 101 is prepared for reactive processing step 20. Metal-bearing material 101 may be prepared in any manner that facilitates the recovery of metal values from metal-bearing material 101—such as, for example, manipulating a composition and/or component concentration of metal-bearing material 101—for the chosen reactive processing method of step 20. Desired composition and component concentration parameters can be achieved through a variety of chemical and/or physical processing stages, the choice of which will depend upon the operating parameters of the chosen processing scheme, equipment cost and material specifications. For example, metal-bearing material 101 may undergo comminution, flotation, blending, and/or slurry formation, as well as chemical and/or physical conditioning in preparation step 10 before metal extraction. Any processing of metal-bearing material 101 which improves the ability to recover metal value from the material is in within the scope of the present disclosure.

In various exemplary embodiments, step 10 comprises a controlled grinding step. Controlled grinding may be used to produce a uniform particle size distribution of metal-bearing material 101. Additionally, liquid, such as process water, may be added to metal-bearing material 101 to create a pulp density which corresponds to desirable operating conditions of the controlled grinding unit. Acceptable techniques and devices for reducing the particle size of the metal-bearing material include, for example, ball mills, tower mills, grinding mills, attrition mills, stirred mills, horizontal mills and the like, and additional techniques may later be developed that may achieve the desired result of reducing the particle size of the copper-bearing material to be transported.

After metal-bearing material 101 has been suitably prepared for metal recovery processing, it may be combined with any number of liquid feed streams to form a metal-bearing inlet stream 103. Preferably, in an exemplary embodiment of the present invention, the liquid feed stream comprises process water, but any suitable liquid may be employed, such as, for example, recycled raffinate, pregnant leach solution, lean electrolyte, and/or other recycled streams from the metal recovery processes, including but not limited to secondary metal, such as cobalt or iron, recovery process streams.

After step 10, metal-bearing inlet stream 103 may be forwarded to a reactive processing step 20. Step 20 may comprise any process or reaction which places metal-bearing inlet stream 103 in condition for later metal recovery processing. Such processes may include, for example, a leaching step. In such configurations, the leaching step may comprise atmospheric leaching, ammonia leaching, pressure leaching, whole ore leaching, agitation leaching, heap leaching, stockpile leaching, pad leaching, thin-layer leaching and/or vat leaching, at either ambient or elevated temperatures, or any suitable process or reaction that puts metal value in metal-bearing inlet stream 103 in a condition such that it may be subjected to later metal recovery processing, is within the scope of the present disclosure.

During step 20, the metal value is solubilized or otherwise liberated in preparation for later recovery processes. Any substance that assists in solubilizing the metal value, and thus releasing the metal value from a metal-bearing material, may be used. For example, where copper is the metal being recovered, an acid, such as sulfuric acid, may be contacted with the copper-bearing material such that the copper is solubilized for later recovery steps. However, it should be appreciated that any suitable method of solubilizing metal value in preparation for later metal recovery steps is within the scope of the disclosure.

After step 20, the metal-bearing product stream 105 may undergo one or more optional conditioning steps 30. In an exemplary embodiment, product stream 105 of reactive processing step 20 is conditioned to adjust the composition, component concentrations, solids content, volume, temperature, pressure, and/or other physical and/or chemical parameters to desired values. Generally, a properly conditioned metal-bearing product stream 105 will contain a relatively high concentration of soluble metal, for example, copper sulfate, in an acid solution and may contain few impurities. Moreover, the conditions of the metal-bearing product stream 105 may be kept substantially constant to enhance the quality and uniformity of the copper product ultimately recovered.

By way of example, step 30 may comprise adjusting certain physical parameters of the product stream 105. Step 30 may comprise, for example, reagent additions, flashing processes, and one or more solid-liquid phase separation steps. For example, in various exemplary embodiments, product stream 105 may be further conditioned in preparation for later metal value recovery steps by one or more solid-liquid phase separation steps for the purpose of separating solubilized metal solution from solid particles. This may be accomplished in any conventional manner, including use of filtration systems, CCD circuits, thickeners, clarifiers, and the like. A variety of factors, such as the process material balance, environmental regulations, residue composition, economic considerations, and the like, may affect the decision whether to employ a CCD circuit, a thickener, a filter, a clarifier, or any other suitable device in a solid-liquid separation apparatus. One or more solid-liquid phase separation steps may be carried out with a conventional CCD utilizing conventional countercurrent washing of the residue stream to recover leached metal values to one or more solution products and to minimize the amount of soluble metal values advancing with the solid residue to further metal recovery processes or storage.

In various exemplary embodiments, step 30 comprises a solid-liquid phase separation step to produce a first metal-bearing solution and a second metal-bearing solution. In such embodiments, the first metal-bearing solution comprises a high-grade pregnant leach solution ("HGPLS") 102, comprising relatively high concentrations of dissolved metal values, and the second metal-bearing solution comprises a low-grade pregnant leach solution ("LGPLS") 106, comprising a lower concentration of dissolved metal values than HGPLS 102. While the concentration of a primary metal value of both HGPLS and LGPLS may vary on an absolute basis, in various embodiments, the HGPLS will have a higher concentration of a primary metal value than the LGPLS. Stated another way, HGPLS and LGPLS may contain very low, or very high, primary metal value concentrations.

In various exemplary embodiments, large amounts of wash water are utilized in a solid-liquid phase separation step 30. This wash water collects the remaining dissolved metal values from product stream 105 and may become part of LGPLS 106. The separated solids may further be subjected to later processing steps, including other metal recovery processes, such as, for example, recovery of gold, silver, platinum group metals, molybdenum, zinc, nickel, cobalt, uranium, rhenium, rare earth metals, and the like, by sulphidation, cyanidation, or other techniques. Alternatively, the separated solids may be subject to impoundment or disposal.

In various exemplary embodiments, at least one HGPLS (e.g., solution 102) and at least one LGPLS (e.g., solution 106) are forwarded to a solution extraction step 40. Step 40 produces at least one primary metal value containing stream 192 and may produce one or more secondary metal value containing streams, e.g., low grade raffinate 146. For example, as discussed in connection with FIGS. 2 and 3, two HGPLS streams and one LGPLS stream may be forwarded to solution extraction step 40. In other aspects, a single HGPLS stream and a single LGPLS stream may be provided to solution extraction step 40.

In many instances, due to variations in concentration and quality of the metal-bearing material 101, it may be advantageous to mix one or more leach solutions prior to solution extraction to form a first metal-bearing solution and/or a second metal-bearing solution. Additionally or alternatively, it may be beneficial to process two or more separate leach solution streams produced by multiple leach processes in a single solution extraction process or system. For example, if an operation has both a heap leach operation and a pressure or agitated leach operation, then the heap leach solution, equivalent to the LGPLS, may need to be processed with a more concentrated pregnant leach solution, such as HGPLS. It is not required that the HGPLS and LGPLS are produced from the same step 20; the HGPLS, LGPLS, or both can be produced by one or more steps 20. Additionally, multiple steps 30, such as controlled grinding steps, flashing steps, and/or solid-liquid phase separation steps may be utilized to produce the HGPLS and/or the LGPLS.

In various exemplary embodiments, the LGPLS has a concentration of a primary metal value greater than about 20% of the concentration of the primary metal value in the HGPLS. Preferably, the LGPLS has a concentration of the primary metal value greater than about 40% of the concentration of the primary metal value in the HGPLS. Most preferably, the LGPLS has a concentration of the primary metal value greater than about 50% of the concentration of the primary metal value in the HGPLS.

In step 40, at least one raffinate may be produced. The at least one raffinate can be low-grade raffinate with a relatively low primary metal concentration and a relatively high secondary metal concentration. The low-grade raffinate may be forwarded to secondary metal recovery processes, such as a secondary metal recovery step 60 (which is discussed in more detail below). The production of any number and/or type of raffinate is within the scope of the present disclosure.

Figure 2:
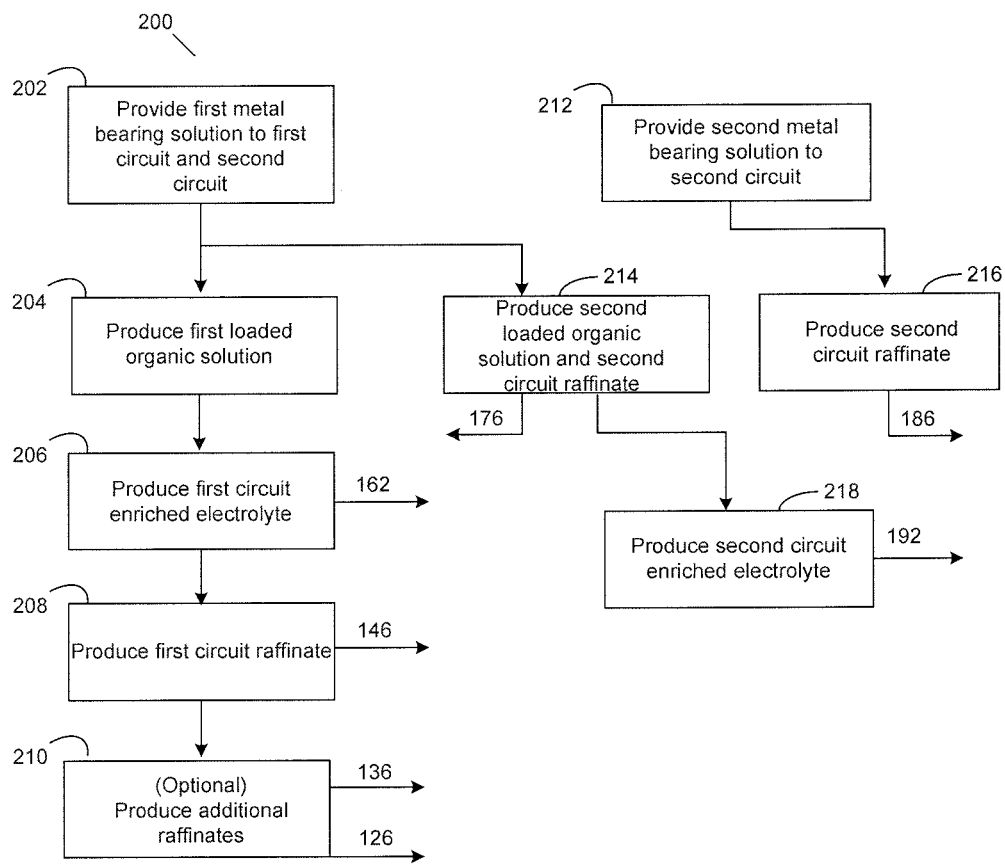
FIG. 2 illustrates a flow diagram of a solution extraction step of a metal recovery process in accordance with exemplary embodiments of the invention.

With initial reference to FIG. 2, an exemplary solution extraction process 200, suitable for step 40, is illustrated. Although individual steps of process 200 may be described as occurring sequentially, in some instances, the steps may occur simultaneously, or in a different process order than described below.

Process 200 includes the steps of providing a first metal-bearing solution to a first and second solution extraction circuit (step 202), producing a first loaded organic stream (step 204), producing a first circuit enriched electrolyte (step 206), producing a first circuit raffinate (step 208), optionally producing additional first circuit raffinates (step 210), providing a second metal-bearing solution to the second circuit (step 212), producing a second circuit loaded organic stream and second circuit raffinate (step 214), producing a second second circuit raffinate (step 216), and producing a second circuit enriched electrolyte (step 218).

Figure 3:
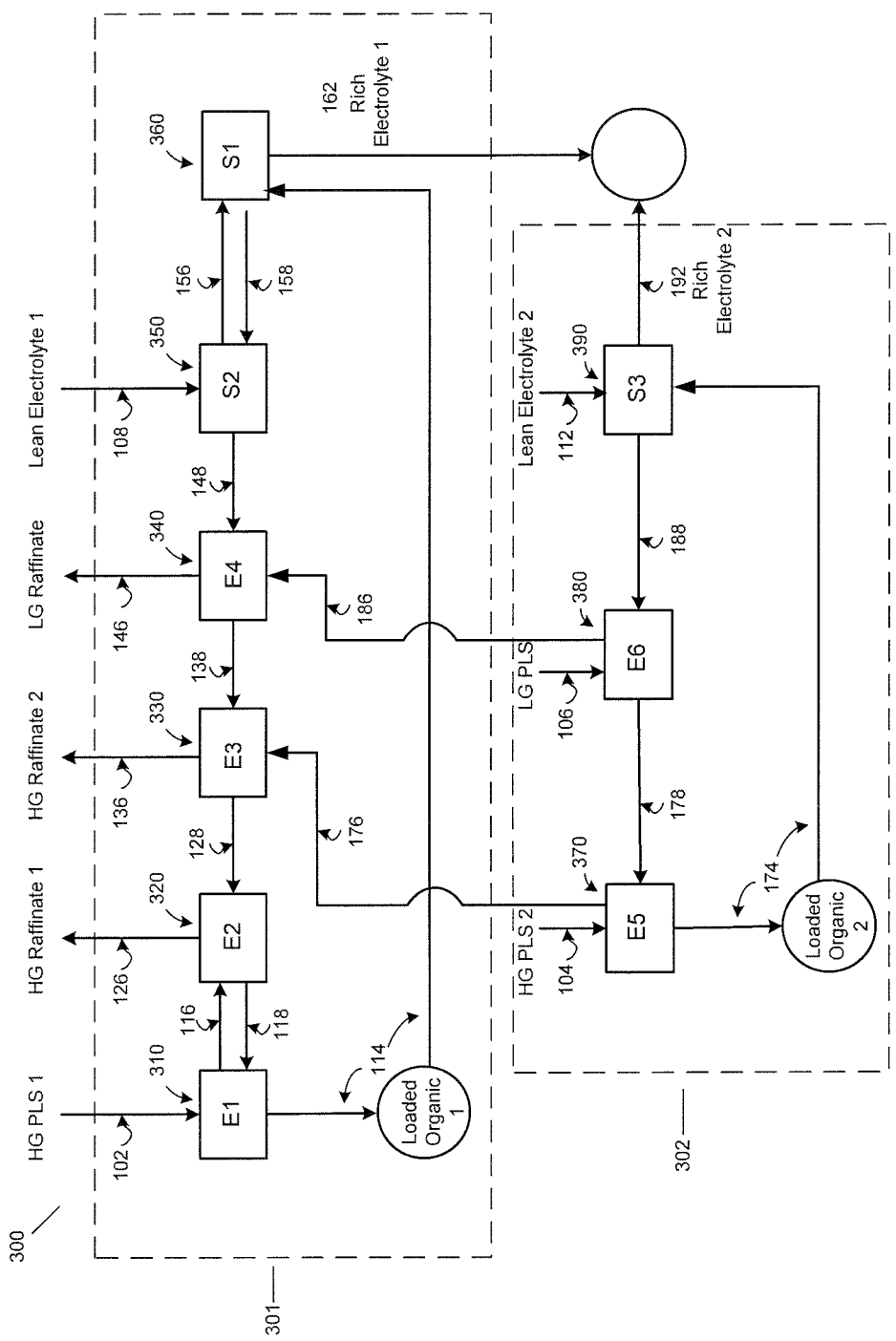
FIG. 3 illustrates a flow diagram of a solution extraction system in accordance with an exemplary embodiment of the invention.

With initial reference to FIG. 3, in various exemplary embodiments, process 200 is performed using a single solution extraction plant 300 comprising a first solution extraction circuit 301 and a second solution extraction circuit 302. In various embodiments, one or more process streams are forwarded from the second solution extraction circuit to the first solution extraction circuit. In this case, a system and method provide, inter alia, efficient and controllable metal solution extraction from at least two separate pregnant leach solution feed streams, which may be used to recover two or more recoverable metal values. Where two metal values may be recoverable, one metal value may be referred to as a primary metal value and the other referred to as a secondary metal value.

In the illustrated case, first circuit 301 is configured to receive HGPLS 102 and lean electrolyte 108 and produce a rich electrolyte 162 and one or more raffinates 126, 136, and/or 146. First circuit 301 includes at least two extractors and at least one stripping unit. In the illustrated case, first circuit 301 includes four extractors (310, 320, 330, and 340) and two stripping units (350 and 360) which are fluidly coupled together.

Second circuit 302 is configured to receive a HGPLS 104 and a LGPLS 106, and includes at least two extractors and at least one stripping unit. In the illustrated case, second circuit includes two extractors (370 and 380) and one stripping unit 390 which are fluidly coupled together. However, the use of additional extractors and stripping units in second circuit 302 is within the scope of the present disclosure.

With reference to FIG. 2 and FIG. 3, step 202 includes providing a first metal-bearing solution to a first circuit and a second circuit. By way of example, step 202 comprises providing HGPLS 102 to a first circuit extractor 310 of first circuit 301 and HGPLS 104 to a second circuit extractor 370 of second circuit 302. However, in various embodiments, HGPLS 102 may be provided to first circuit 301 and a second HGPLS 104 may be provided to second circuit 302. It is not required that HGPLS 102 and second HGPLS 104 be equivalent or derived from the same prior reactive processing step or steps 20.

In step 204, a first loaded organic stream 114 is formed by contacting HGPLS 102 with a partially loaded organic stream 118. In such configurations, extractor 310 produces a first loaded organic stream 114 and an aqueous stream 116.

In step 206, a first circuit enriched electrolyte 162 is formed by contacting first loaded organic stream 114 with an intermediate electrolyte 156, which is aqueous stream comprising a lower concentration of primary metal than that of first circuit enriched electrolyte 162, in stripping unit 360. Stripping unit 360 further produces a partially stripped organic stream 158, which may be forwarded for further processing in the first circuit 301.

In such embodiments, intermediate electrolyte 156 is produced by a stripping unit 350. Stripping unit 350 is configured to receive a lean electrolyte 108 and partially stripped organic stream 158 from stripping unit 360. Intermediate electrolyte 156 is formed by contacting lean electrolyte 108 and partially stripped organic stream 158 in stripping unit 350. Intermediate electrolyte 156 is then forwarded to stripping unit 360.

In step 208, first circuit raffinate 146 is produced by contacting barren organic stream 148 with second circuit raffinate 186 in extractor 340. Barren organic stream 148 comprises a metal-specific extraction reagent, such as, for example, an aldoxime and/or ketoxime, which extracts a primary metal value from second circuit raffinate 186 into the organic phase to form a partially loaded organic stream 138 and first circuit raffinate 146. Barren organic may be recycled from various other processes and solution extraction components. As such, the term "barren" means sufficiently low in concentration of a primary metal value.

In an aspect of various embodiments, first circuit raffinate 146 is a low-grade raffinate. As will be discussed in greater detail below, low-grade raffinate 146 may be forwarded to further processing for secondary metal recovery. (e.g., step 60 of process 100).

In step 210, additional extractors may be added to first circuit 301 to produce at least one additional raffinate. These raffinates may be aqueous solutions with a relatively low primary metal concentration, such as low-grade raffinates, or aqueous solutions with a primary metal concentration higher than low-grade raffinates, such as high-grade raffinates. The use of any number or configuration of additional extractors in first circuit 301 is within the scope of the present disclosure.

For example, additional extractors 320 and 330 are configured to receive partially loaded organic streams 128 and 138 and metal-bearing aqueous solutions, such as 176 and 116. In such embodiments, the partially loaded organic streams and aqueous solutions are contacted within extractors 320 and 330, producing partially loaded organic streams 118 and 128 and aqueous high-grade raffinates 126 and 136.

High-grade raffinates 126 and 136 may be used beneficially in a number of ways. For example, all or a portion of high-grade raffinates 126 and 136 may be recycled to step 10. The use of high-grade raffinates 126 and 136 in leaching operations may be beneficial because the acid and ferric iron values contained in high-grade raffinates 126 and 136 may optimize the potential for leaching oxide and/or sulfide ores that commonly dominate many leaching operations. That is, the ferric and acid concentrations of high-grade raffinates 126 and 136 may be used to optimize the pH of heap leaching operations. It should be appreciated that the properties of high-grade raffinates 126 and 136, such as component concentrations, may be adjusted in accordance with the desired use high-grade raffinates 126 and 136.

Extractor 330 may be configured to receive a second circuit raffinate 176. In such configurations, second circuit raffinate 176 is forwarded to first circuit 301 from second circuit 302. Any number of second circuit raffinates may be forwarded from second circuit 302 to first circuit 301, provided a first circuit extractor is configured to receive the second circuit raffinate.

Step 212 provides LGPLS 106 to second circuit 302 (e.g., extractor 380). LGPLS 106 may be provided by step 30 of metal recovery method 100 or from other sources. LGPLS 106 may comprise, for example, wash water collected from prior conditioning steps, such as a solid-phase separation and/or a flashing of the slurry. In other aspects, LGPLS 106 may comprise the liquid product of a leaching step performed on a lower grade metal-bearing material than the metal-bearing material used to produce HGPLS 102 and/or 104. Any LGPLS 106 which includes primary metal value and is of a lower concentration than the HGPLS 104 is within the scope of the present disclosure.

In step 214, a second raffinate is provided. In the illustrated embodiment, the second raffinate is produced by contacting HGPLS 104 with a partially loaded organic stream 178 in extractor 370 to produce second loaded organic stream 174 and second circuit raffinate 176. Second circuit raffinate 176 may be provided to an extractor (such as extractor 330) of first circuit 301. However, second circuit raffinate 176 may be provided to any component of first circuit 301 which is configured to receive the raffinate. In addition, second circuit raffinate 176 may be provided to other processes, as described above in relation to first circuit raffinates 126 and 136.

In step 216, another second circuit raffinate is formed by contacting LGPLS 106 with barren organic stream 188 in extractor 370 to produce a second circuit raffinate 186 and a partially loaded organic stream 178. In an aspect of these embodiments, second circuit raffinate 186 may be provided to an extractor (such as extractor 340) of first circuit 301. However, second circuit raffinate 186 may be provided to any component of first circuit 301 which is configured to receive the raffinate. In addition, second circuit raffinate 186 may be provided to other processes, as described above in relation to first circuit raffinates 126 and 136.

When second circuit raffinate 176 or 186 is provided to first circuit extractor 340, extractor 340 may produce a raffinate 146 containing a relatively low concentration of primary metal. This occurs because raffinate 146 is produced by contacting an aqueous stream with a barren organic stream in two consecutive stages. For example, in FIG. 3, raffinate 146 is formed by contacting LGPLS 106 with barren organic stream 188 in second circuit extractor 380. The resulting aqueous stream (e.g., second circuit raffinate 186) is then contacted with barren organic stream 148 in first circuit extractor 340. This double exposure to barren organic, which is very low in primary metal concentration, produces a raffinate 146 which has a very low concentration of primary metal. Raffinate 146 is therefore well suited to secondary metal recovery step 60.

In the case where an aqueous stream is forwarded from second circuit 302 to first circuit 301 to produce a raffinate low in primary metal value, the operating conditions of second circuit 302 significantly impact the quality of the raffinate. For example, as illustrated in FIG. 3, the concentration of primary metal value in raffinate 146 is dependent upon the concentration of primary metal value in second circuit raffinate 186. In such configurations, it may be desirable to control the process conditions such that second circuit raffinate 186 is low in primary metal value concentration.

With continued reference to FIG. 2, in step 218, second circuit enriched electrolyte 192 is formed by, for example, contacting second loaded organic stream 174 with an aqueous solution in stripping unit 390. In an aspect of these embodiments, the aqueous solution comprises lean electrolyte 112. However, the use of any aqueous solution having a primary metal concentration lower than second circuit enriched electrolyte 192 is within the scope of the present disclosure.

Second circuit enriched electrolyte stream 192 may be combined with first circuit enriched electrolyte stream 162. The combined rich electrolyte may be forwarded to primary metal value recovery processes (e.g., step 50 of process 100). In other embodiments, second circuit enriched electrolyte stream 192 is not combined with first circuit enriched electrolyte stream 162, and may be processed independently. In yet other embodiments, either or both of first circuit enriched electrolyte stream 162 and second circuit enriched electrolyte stream 192 may be sent to an electrolyte recycle tank. The electrolyte recycle tank may suitably facilitate process control for an electrowinning circuit, as will be discussed in greater detail below.

The particular embodiment described in connection with FIG. 3 merely illustrates an exemplary system for solution extraction in accordance with the present disclosure. Various other exemplary embodiments comprise multiple stripping units and extractors arranged in series, parallel, and/or split configurations. For example, various exemplary embodiments may utilize a first circuit and/or second circuit with additional or fewer stripping units and/or extractors than first circuit 301 and/or second circuit 302. Additional exemplary embodiments are discussed in further detail below. The use of any suitable number of stripping units and extractors, in any suitable configuration, is within the scope of the present disclosure.

Figure 4:
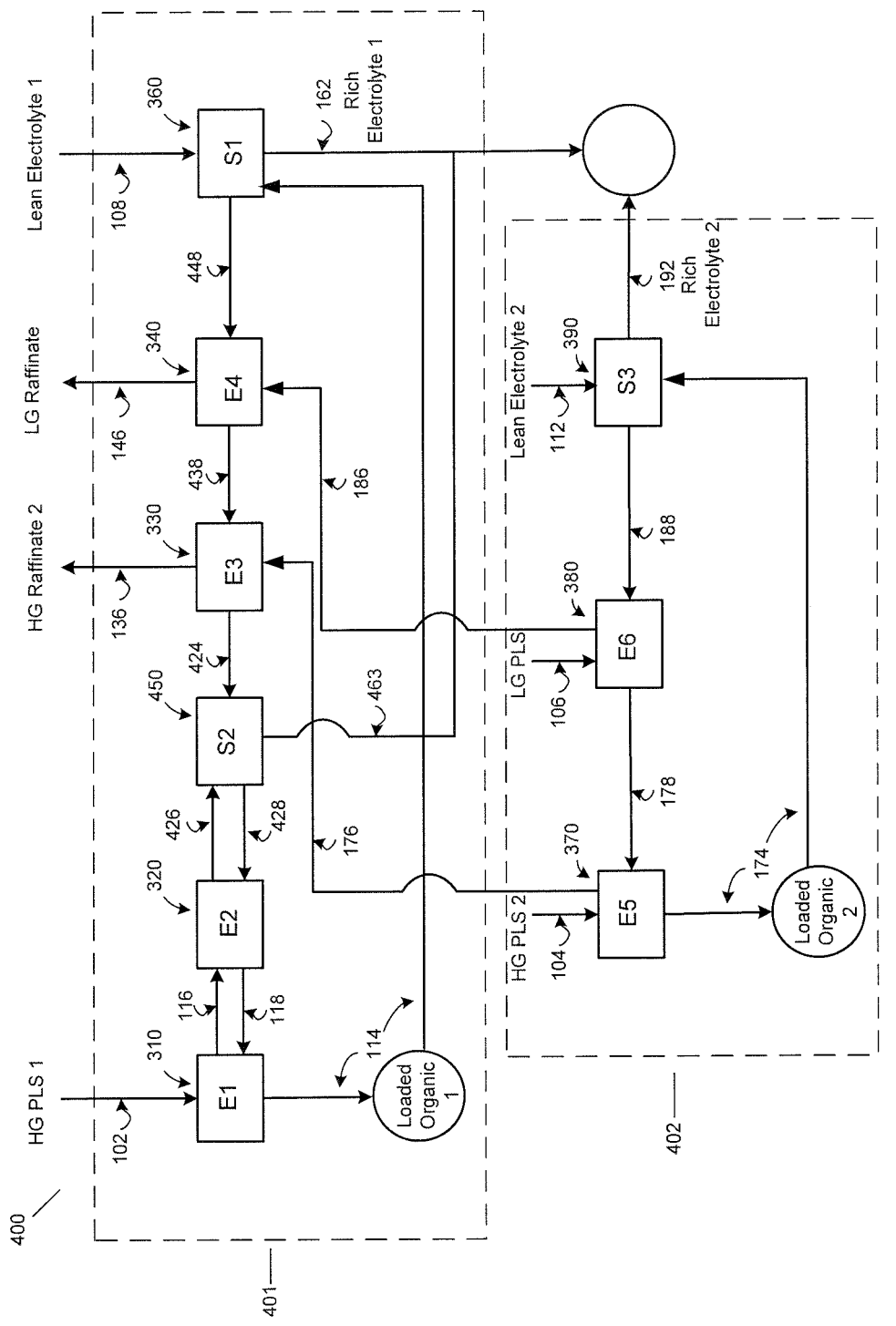
FIG. 4 illustrates a flow diagram of a solution extraction system in accordance with another exemplary embodiment of the invention.

With initial reference to FIG. 4, another exemplary solution extraction plant 400 suitable for use in processes 100 and 200 is illustrated. Solution extraction plant 400 comprises a first circuit 401 and a second circuit 402. Second circuit 402 may be the same or substantially similar to second circuit 302. First circuit 401 is similar to first circuit 301, as both comprise four extractors (310, 320, 330, and 340) and two stripping units (350 and 360). However, the location of stripping unit 450 of first circuit 401 differs from the location of stripping unit 350 of first circuit 301.

As illustrated in FIG. 4, stripping unit 360 of first circuit 401 receives first loaded organic stream 114 and lean electrolyte 108, and produces first circuit enriched electrolyte stream 162 and barren organic stream 448.

Extractor 340 of first circuit 401 is configured to receive barren organic stream 448 and second circuit raffinate 186, and produces low-grade raffinate 146 and a partially loaded organic stream 438. Extractor 330 is configured to receive partially loaded organic stream 438 and second circuit raffinate 176, and produces high-grade raffinate 136 and a loaded organic stream 424.

Stripping unit 450 of first circuit 401 is located between extractors 320 and 330. Stripping unit 450 receives partially loaded organic stream 424 and a raffinate 426, and produces a barren organic stream 428 and an enriched electrolyte 463. Enriched electrolyte 463 can be combined with first circuit enriched electrolyte 162, if desired. Barren organic stream 428 is forwarded to extractor 320, which produces raffinate 426 and partially loaded organic stream 118.

Figure 5:
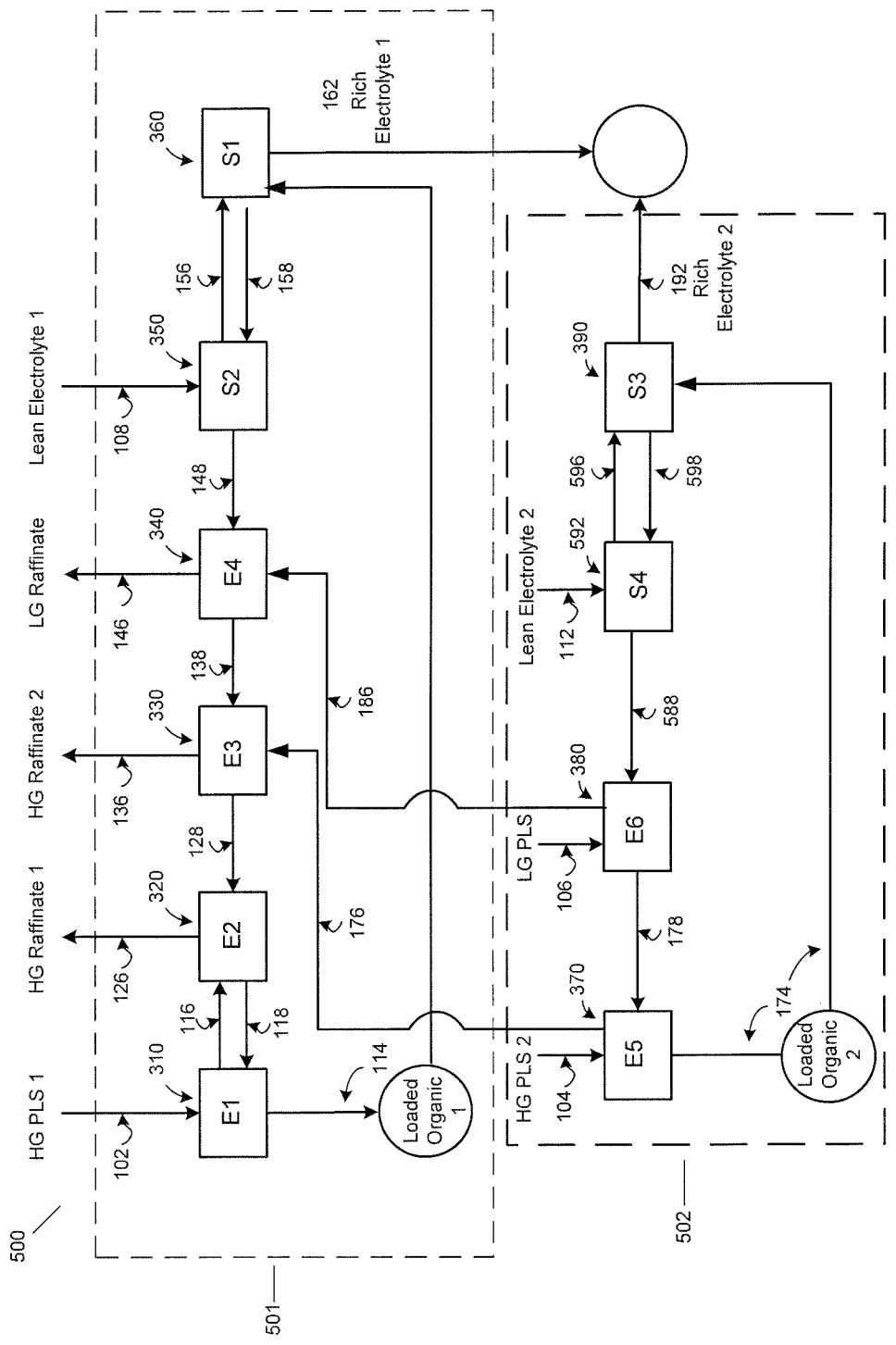
FIG. 5 illustrates a flow diagram of a solution extraction system in accordance with yet another exemplary embodiment of the invention.

With initial reference to FIG. 5, yet another exemplary solution plant 500 suitable for use in processes 100 and 200 is illustrated. Solution extraction plant 500 comprises a first circuit 501 and a second circuit 502. First circuit 501 may be the same or substantially similar to first circuit 301 of solution extraction plant 300. Second circuit 502 is similar to second circuit 302, and further comprises an additional stripping unit 592. In such configurations, lean electrolyte 112 is contacted with a partially stripped organic stream 598 in stripping unit 592, producing an intermediate electrolyte 596 and a barren organic 588. Extractor 380 of second circuit 502 is configured to receive barren organic stream 588 and LGPLS stream 106, and produces partially loaded organic stream 178 and second circuit raffinate 186.

Stripping unit 390 of second circuit 502 produces second circuit enriched electrolyte 192 and partially stripped organic stream 598 by contacting the intermediate electrolyte 596 with loaded organic stream 174. Although two stripping units are illustrated in second circuit 502, the use of any suitable number of stripping units in second circuit 502 is within the scope of the present disclosure.

The present disclosure illustrates a number of exemplary solution extraction plants comprising a first circuit and a second circuit in fluid communication with each other. Although the illustrated embodiments disclose particular combinations of first circuits (such as 301, 401, and 501) and second circuits (such as 302, 402, and 502), any first circuit and second circuit may be used together in a solution extraction plant. Stated another way, any combination of circuits (such as first circuit 401 and second circuit 502) is within the scope of the present disclosure.

Referring again to FIG. 1, in an exemplary embodiment, metal recovery process 100 further comprises primary metal recovery step 50, in which a solution containing a sufficiently high amount of primary metal is forwarded to a process to extract the primary metal from the solution. For example, first circuit enriched electrolyte 162 and/or second circuit enriched electrolyte 192 may be forwarded to further metal recovery processes. In accordance with various aspects of the embodiments, step 50 may comprise any metal recovery process, for example, electrowinning, sulphidation, precipitation, ion exchange or any other process suitable for recovery of metals. Primary metals to be recovered may include copper, silver, platinum group metals, molybdenum, zinc, nickel, cobalt, uranium, rhenium, rare earth metals, and the like. By way of an example, step 50 may comprise an electrowinning circuit suitably designed to carry out any electrowining process capable of producing a metal cathode product. However, any metal recovery process which results in a relatively pure metal product is within the scope of the present disclosure.

With continued reference to FIG. 1, an exemplary secondary metal recovery step 60 includes recovering metal from a low-grade raffinate. In various exemplary embodiments, step 60 may comprise any metal recovery process such as, for example, electrowinning, sulphidation, precipitation, ion exchange, cyanidation, or any other process suitable for recovery of secondary metals. Further, as discussed in some detail below, in various exemplary embodiments, precipitation processes are used, thus making it advantageous to have low concentrations of primary metals in low-grade raffinate 146. Additionally, in various exemplary embodiments, secondary metals to be recovered in step 60 may include, silver, platinum group metals, molybdenum, zinc, nickel, cobalt, uranium, rhenium, rare earth metals, and the like.

As mentioned above, the quality of metal-bearing material 101 can vary widely over the course of a metal recovery process 100. Due to this variation, both primary and secondary metal recovery processes can evidence losses in efficiency and overall processing yields. One reason for these losses is the inability to control and tune the quality and composition of low-grade raffinate 146 from the step 40. For example, low-grade raffinate 146 may be subjected to a selective precipitation process wherein all metal ions except for those of the secondary metal to be recovered such as, for example, cobalt, are eliminated from the low-grade raffinate 146 by precipitating them as solids. These precipitated primary metal solids may be recycled to step 20. These precipitated solids may have a high probability of being rendered unrecoverable, depending on the precipitating mechanism employed. In the instance where there is high primary metal concentration in low-grade raffinate 146, the amount of precipitated primary metal solids recycled to step 20 may increase. This increase in precipitated metal solids may lead to process inefficiencies due to high circulating loads in various steps 30.

Similarly, the inability to control and tune the quality and concentration of low-grade raffinate 146 directly affects the costs associated with step 60. For instance, low primary metal quality and concentration in low-grade raffinate 146 may require less reagent to effect precipitation (operating cost savings). Thus smaller equipment can be used to recycle the copper precipitate (capital cost savings).

Various embodiments of the present metal recovery process advantageously allow for control and tuning of the low-grade raffinate 146. Moreover, step 40 may allow for control and tuning of low-grade raffinate 146 by adjustment of parameters such as, for example, the barren organic flow rate, reagent content, feed material flow rate, and/or any combinations thereof. Additionally, in various exemplary embodiments, the overall efficiency of the metal recovery process may be influenced by blending the primary metal solids precipitated from the low-grade raffinate with high-grade raffinate prior to recycling to the reactive process step.

By making any of these adjustments to control and tune the quality and concentration in the low-grade raffinate, the low-grade raffinate should preferably contain very limited amounts of the primary metal, which allows for efficient secondary metal processing. Additionally, the metal recovery process and solution extraction system described above allows plant operators to maintain a substantially controlled metal concentration in the HGPLS stream, LGPLS stream, and the raffinate streams.

As discussed above, in various embodiments, the flow rate and concentration of the barren organic flow containing a metal-specific extraction reagent can be altered based on the incoming metal ore quality to maintain a constant concentration of metal in the low-grade raffinate, allowing for efficient secondary processing of other metals, including but not limited to cobalt recovery. In an aspect of these embodiments, because both the HGPLS and LGPLS streams are treated in one facility, the metal content of the LGPLS may be controlled and held constant by adjusting LGPLS rate according to grade, with the excess being blended with the HGPLS.

The present disclosure allows the extraction circuit for the primary metal value to be tuned and optimized, both in terms of metallurgical performance and capital and operating costs. There is a trade off between achieving optimum metallurgical performance and minimizing the capital costs of the operating facility. The decisions made regarding this trade off are based on the performance and cost of the metal-specific extraction reagent employed as well as the chemistry of the pregnant leach solution streams to be treated. For example, the use of a metal-specific extraction reagent which exhibits rapid extraction kinetics may minimize the number of sequential extractors needed to achieve a satisfactory level of metal recovery. The presence of iron, manganese, or chloride in the pregnant leach solution streams may require the use of a wash stage prior to stripping. The number and placement of stripping units may be decided based on the stripping kinetics of the extraction reagent as well as its maximum metal loading capacity. Accordingly, various configurations are within the scope of the present disclosure.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. The subject matter of the invention includes all novel and non-obvious combinations and sub combinations of the various elements, features, functions and/or properties disclosed herein and their equivalents.

The method and system described herein may be implemented to recover copper and other metals in a controlled manner. Other advantages and features of the present systems and/or methods may be appreciated from the disclosure herein and the implementation of the method and system.

The invention claimed is:

1. A method of extracting a metal value comprising:
extracting, using a first circuit of a solution extraction plant, a first electrolyte; and
extracting, using a second circuit of the solution extraction plant, a second electrolyte, wherein the first circuit comprises at least two first circuit extractors and at least one first circuit stripping unit, wherein the second circuit comprises at least two second circuit extractors and at least one second circuit stripping unit, wherein the first circuit and the second circuit are in fluid communication.

2. The method of claim 1, further comprising forwarding a first electrolyte to a primary electrowinning unit.

3. The method of claim 1, further comprising forwarding a second electrolyte to a second electrowinning unit.

4. The method of claim 1, further comprising extracting, using the first circuit of the solution extraction plant, a first circuit raffinate.

5. The method of claim 1, further comprising extracting, using the second circuit of the solution extraction plant, a second circuit raffinate.

6. The method of claim 5, further comprising forwarding the second circuit raffinate to the first circuit.

7. The method of claim 5, further comprising extracting, using the second circuit of the solution extraction plant, a second second circuit raffinate.

8. The method of claim 7, further comprising forwarding the second second circuit raffinate to the first circuit.

9. The method of claim 1, further comprising extracting, using the first circuit of the solution extraction plant, a raffinate.

10. The method of claim 1, further comprising forwarding a third electrolyte to the at least one first circuit stripping unit or the at least one second circuit stripping unit, and wherein the third electrolyte is an electrolyte solution comprising a lower concentration of metal than the first electrolyte and the second electrolyte.

11. The method of claim 1, wherein the metal value comprises copper.

12. A method of extracting a metal value comprising:
forwarding a first electrolyte to a primary electrowinning unit; and
forwarding a second electrolyte to a second electrowinning unit, wherein the first electrolyte is produced by a first circuit of a solution extraction plant, wherein the second electrolyte is produced by a second circuit of the solution extraction plant, wherein the first circuit comprises at least two first circuit extractors and at least one first circuit stripping unit, wherein the second circuit comprises at least two second circuit extractors and at least one second circuit stripping unit, wherein the first circuit and the second circuit are in fluid communication.

13. The method of claim 12, further comprising extracting, using the first circuit of the solution extraction plant, a first circuit raffinate.

14. The method of claim 12, further comprising extracting, using the second circuit of the solution extraction plant, a second circuit raffinate.

15. The method of claim 14, further comprising extracting, using the second circuit of the solution extraction plant, a second second circuit raffinate.

16. The method of claim 14, further comprising forwarding the second circuit raffinate to the first circuit.

17. The method of claim 15, further comprising forwarding the second second circuit raffinate to the first circuit.

* * * * *